United States Patent
Hämäläinen et al.

(10) Patent No.: US 6,701,130 B1
(45) Date of Patent: Mar. 2, 2004

(54) TIMING METHOD AND ARRANGEMENT FOR PERFORMING PREPARATORY MEASUREMENTS FOR INTERFREQUENCY HANDOVER

(75) Inventors: Seppo Hämäläinen, Espoo (FI); Jussi Numminen, Turku (FI)

(73) Assignee: Nokia Mobile Phones Ltd.

( * ) Notice: Subject to any disclaimer, the term of this patent is extended or adjusted under 35 U.S.C. 154(b) by 542 days.

(21) Appl. No.: 09/694,237

(22) Filed: Oct. 23, 2000

(30) Foreign Application Priority Data

Oct. 25, 1999 (FI) .............................. 19992304

(51) Int. Cl.[7] .............................. H04B 17/00
(52) U.S. Cl. .................... 455/67.11; 455/437; 455/442; 370/331; 370/335
(58) Field of Search ................. 455/436, 437, 455/442, 67.11, 67.13; 370/331, 332, 335, 342

(56) References Cited

U.S. PATENT DOCUMENTS 5,896,368 A * 4/1999 Dahlman et al. ........... 370/335

FOREIGN PATENT DOCUMENTS

| EP | 1081977 | 3/2001 |
|---|---|---|
| WO | WO 94/29981 | 12/1994 |
| WO | WO 97/40592 | 10/1997 |
| WO | WO 99/43177 | 8/1999 |
| WO | WO 99/43178 | 8/1999 |

* cited by examiner

*Primary Examiner*—Lee Nguyen
(74) *Attorney, Agent, or Firm*—Perman & Green, LLP

(57) ABSTRACT

A method and an arrangement are provided for performing a transition from a continuous communication mode (601, 701, 801) into a combined slotted communication mode and measurement mode (602, 802, 803) in a mobile station (402) of a cellular radio system. A set of criteria is provided that are to be observed during the continuous communication mode (601, 701, 801). It is observed, whether at least one of said criteria is fulfilled during the continuous communication mode (601, 701, 801). As a response to the fulfilment of at least one of said criteria during the continuous communication mode, the operation of the mobile station (402) is changed into the combined slotted communication mode and measurement mode (602, 802, 803).

14 Claims, 5 Drawing Sheets

TIMING METHOD AND ARRANGEMENT FOR PERFORMING PREPARATORY MEASUREMENTS FOR INTERFREQUENCY HANDOVER

TECHNOLOGICAL FIELD

The invention relates in general to the technology of performing measurements on communication frequencies in a portable terminal of a cellular radio system. Especially the invention relates to the timing of such measurements that are performed on other frequencies than the one currently used for active communication.

BACKGROUND OF THE INVENTION

In the technology of cellular radio systems, an interfrequency handover means that the frequency on which an active communication connection exists between a base station and a mobile station is changed. A cell change may accompany the interfrequency handover, in which case the maneuver is an intercell-interfrequency handover, or the frequency change may take place within a single cell meaning that an intracell-interfrequency handover is performed. The present invention is equally applicable to all interfrequency handover types.

In order to find a suitable target frequency for an interfrequency handover the mobile station must evaluate the available target frequencies in terms of connection quality that it could achieve on them. This in turn necessitates that the mobile station must quickly tune its radio receiver (or one of its radio receivers, in case it comprises several of them) onto each target frequency to be evaluated for a certain period of time. In TDMA (Time Division Multiple Access) systems this is not a problem since the mobile terminal must anyway transmit and receive only during certain cyclically occurring time intervals, between which it has time to tune its receiver onto whatever other frequencies it wants. However, in other systems like CDMA (Code Division Multiple Access) where reception and transmission are essentially continuous it may be problematic to find suitable time intervals for the measurements.

It is known to define and employ a so-called slotted mode for transmission and reception in order to leave certain time intervals free for measurement purposes. Slotted mode means that both transmission and reception are performed only according to a certain predefined slot pattern. FIG. 1 illustrates a set of frame trains of which frame train 101 corresponds to uplink transmission in normal mode, frame train 102 corresponds to downlink transmission in normal mode, frame train 103 corresponds to uplink transmission in slotted mode and frame train 104 corresponds to downlink transmission in slotted mode. The relative lengths of the slotted frames and the silent periods between them are defined in the applicable system specifications.

In a single-receiver station slotted receiving is essential in order to reserve the receiver to the use of the ongoing connection for only a part of the time. Slotted transmitting is not that essential at first sight, but usually it is unavoidable since the transmitter must be powered down for those time periods when the receiver is measuring. Leakage power from the transmitter might easily interfere with an ongoing measurement in the receiver.

Slotted mode is not without problems from the system point of view. Higher transmission power must be used in slotted mode than in continuous mode, since the closed-loop power control between the base station and the mobile station is not functioning properly and since the same amount of information must be sent in a shorter time. However, CDMA systems are extremely sensitive to increasing transmission power, because all simultaneously ongoing transmissions cause interference to each other. Additionally it may happen that the highest allowable transmission power levels were in use already in the continuous mode, in which case is not possible any more to increase the power like the slotted mode would require.

It is possible to avoid the last-mentioned problem by dimensioning the cells of a cellular radio system so that even at the outskirts of each cell there is a power marginal available for employing slotted mode. This means naturally that the operator responsible for the network must erect more base stations, which is economically unattractive.

SUMMARY OF THE INVENTION

It is an object of the present invention to provide a method and an arrangement for performing preparatory measurements for interfrequency handover with only a tolerable increase to the overall interference level in a cellular radio system. It is an additional object of the invention to provide such a method and arrangement without having to build an overdense network of base stations.

The objects of the invention are achieved by establishing a set of rules that determine, when a mobile station should go over to slotted mode in order to prepare for an interfrequency handover.

The method according to the invention is characterized in that it comprises the steps of providing a set of criteria that define to be observed during a continuous communication mode observing, whether at least one of said criteria is fulfilled during the continuous communication mode and as a response to the fulfilment of at least one of said criteria is fulfilled during the continuous communication mode, changing the operation of a mobile station into a combined slotted communication mode and measurement mode.

The invention also applies to an arrangement that is characterized in that it comprises means for storing a set of criteria to be observed during a continuous communication mode means for observing, whether at least one of said criteria is fulfilled during the continuous communication mode and means for reacting to an eventual fulfilment of at least one of said criteria during the continuous communication mode by changing the operation of the mobile station into a combined slotted communication mode and measurement mode.

The advantages of employing slotted mode are obvious from the point of view of making preparatory measurements for interfrequency handover, but unnecessary use of slotted mode must be avoided. After carefully considering the potential situations which may cause an interfrequency handover to be necessary we may present a set of rules that are most advantageously used in a mobile station to trigger the activation of slotted mode.

A first criterion which may cause a mobile station to go over to slotted mode and preparatory measurements for interfrequency handover is the reaching of the maximal transmission power allocated to the mobile terminal especially in the downlink direction. Reaching the maximal transmission power in the downlink direction is easily detected at the mobile station by observing that the received power level does not change remarkably despite of several successive power control commands where the mobile terminal asks for more downlink power.

A second criterion which should trigger the activation of slotted mode and preparatory measurements for interfrequency handover is an unusually high measured level of wideband interference. It is possible to lay down a set of simple rules to define what is unusual in this sense. It is known that a mobile terminal that happens to be very close to the base station it is actively communicating with (the "serving" base station) will experience a relatively high level of wideband interference, but at longer distances the importance of wideband interference should be lower. If, however, e.g. a pathloss measurement shows that the distance to the serving base station is long but the mobile station still experiences a high level of wideband interference, the origin thereof is most probably another base station or other transmitter operating on almost the same frequency. In such a situation it is usually advantageous to perform an interfrequency handover.

A third criterion for the same purpose comes from some estimates which the mobile terminal is able to make during normal operation. It is possible to estimate the interference level on a neighboring channel by subtracting from a measured narrowchannel interference level the estimated unorthogonal cochannel interference, the received thermal noise and the noise generated in the receiver itself. Combining this knowledge to location information e.g. in the form of pathloss measurements it is again possible to detect the presence of a nearby interfering transmitter on a neighboring channel. The mobile terminal may also store and analyze the characteristics of estimated unorthogonal interference compared to detected cochannel interference and apply a set of deduction rules to determine, whether or not there is a powerful interference source on a neighboring channel.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

FIG. 1 has been treated in the description of prior art, so the following description of the embodiments of the invention will focus on FIGS. 2 to 9. Same reference designators in the drawings relate to similar parts.

DETAILED DESCRIPTION OF THE INVENTION

Figure 1:
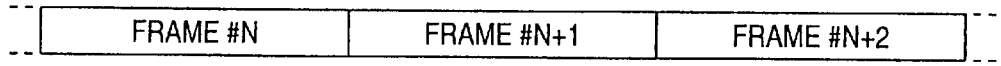
FIG. 1 illustrates the known concept of slotted mode.
Figure 1:
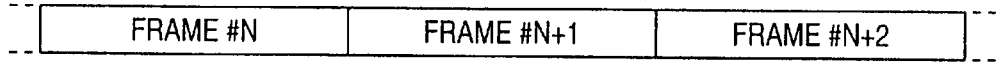
Figure 1:
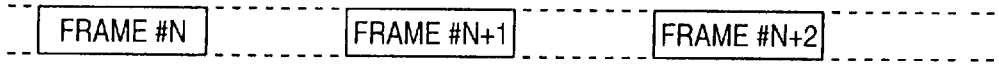
Figure 1:
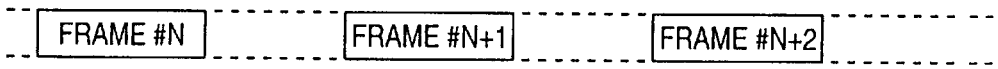
Figure 2:
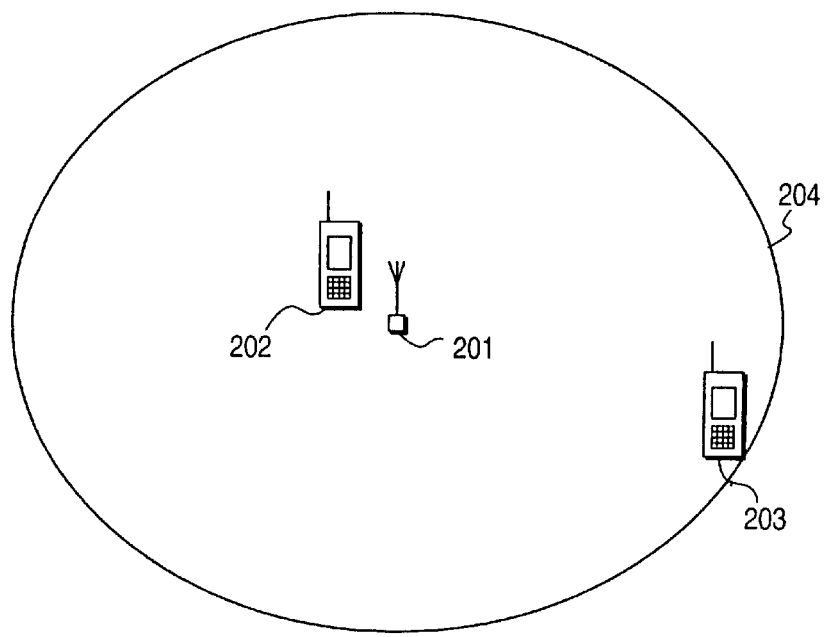
FIG. 2 presents some considerations related to transmission power control.

FIG. 2 illustrates schematically a base station 201 and two mobile stations 202 and 203 of a CDMA-based cellular radio system. The cell or radio coverage area of the base station 201 is shown as an ellipse 204. The first mobile station 202 is relatively close to the base station 201, so relatively low transmission power is sufficient for active communication therebetween. The second mobile station 203 is near the cell border, so a much higher transmission power level must be employed both in the mobile station 203 and the base station 201 to keep the communication connection therebetween from being severed. Transmission power control functions that are known as such are used to control the transmission power both at the base station and at the mobile station in order to take into account the current distance therebetween and the resulting attenuation of radio signals. The operator who is responsible for the cellular radio system tries to dimension the cells so that maximal transmission power should not be needed unless the mobile station is very near to the cell border.

Figure 3:
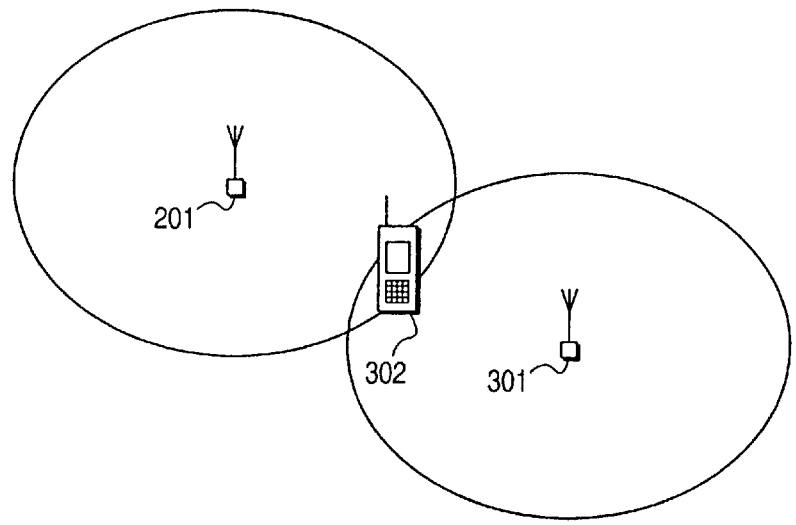
FIG. 3 presents some considerations related to overlapping cochannel cells.

FIG. 3 illustrates schematically a situation where two base stations 201 and 301 of the same CDMA-based cellular radio system have partially overlapping cells. CDMA-based cellular radio systems are basically so-called single-frequency systems where the same transmission frequency may be used in the cells of both base stations 201 and 301. The distribution of orthogonal or nearly orthogonal spreading codes to be used in overlapping cells is determined so that although the base stations of overlapping cells act as cochannel interference sources to each other, despreading arrangements that utilize the (nearly perfect) orthogonality of the spreading codes are enough to separate the desired signal from the interference background in each active communication connection. In practical CDMA systems there are multiple transmission frequencies in use in most cells, but they form kind of overlayed single-frequency networks: in the absence of excessive interference on a certain frequency a mobile station 302 that is about to change cells does not have to care about more than a single communication frequency.

Figure 4:
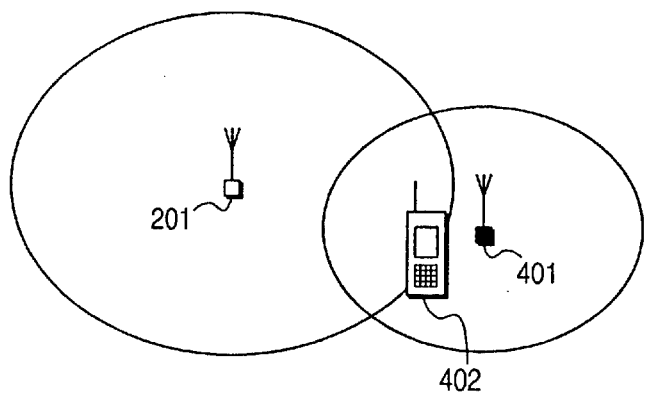
FIG. 4 presents some considerations related to overlapping cellular systems.

FIG. 4 illustrates schematically a situation where a competing telecommunication operator has set up a base station 401 of another system so that a mobile station 402 that is located relatively far from its serving base station 201 comes rather close to the competing base station 401. The authorities that are responsible for frequency allocation must give a different frequency (or a different set of frequencies) to the use of the competing operator. Therefore it may happen that the mobile station 402 sees the transmissions from the other base station 401 as interference the source of which it is unable to determine in detail without making measurements on other frequencies than the one on which it is currently communicating with the serving base station 201.

Figure 5:
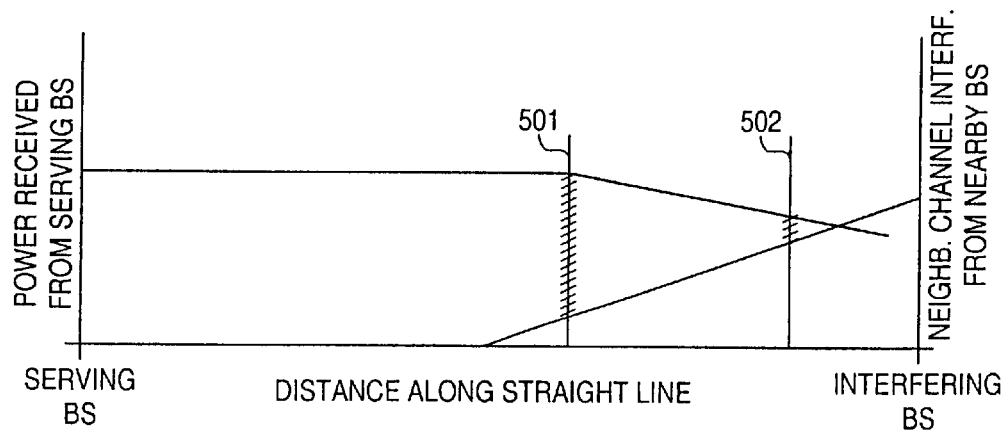
FIG. 5 illustrates the relative magnitudes of received power and neighboring channel interference in one situation.

FIG. 5 is a schematic diagram that shows how the mobile station 402 would see the downlink power transmitted from the serving base station 201 and the neighboring channel interference coming from the other base station 401 if it were travelling along the imaginary straight line connecting the two. The vertical scale is transmission power in some arbitary logarithmic (decibel) units and the horizontal scale is linear distance in some arbitrary units. From the very close vicinity of the serving base station to point 501 the downlink transmission power appears to be essentially constant, because the usual transmission power control functions serve to increase the actual downlink transmission power at the base station 201 as the distance between it and the mobile station 402 increases. From point 501 onwards the transmission power decreases following some essentially logarithmic function which in the scale of FIG. 5 appears as a straight descending line. The neighboring channel interference coming from the other base station 401 decreases according to some function which is approximated as a straight line in FIG. 5.

Moving from point 501 to point 502 means that the hatched marginal between the received signal power and the neighboring channel interference decreases. At some point between points 501 and 502 the mobile station 402 notes that the signal to interference ratio or other quantity which it continuously monitors for power control purposes gets so bad that more downlink transmission power should be requested. The same known power control functions that controlled the downlink transmission power on the left side of point 501 cause the mobile station to transmit corresponding power control commands to the serving base station 201. However, because the mobile terminal is already beyond point 501, the maximal allowed downlink power has been reached and the serving base station 201 does not respond to requests asking for more downlink power.

If we compare the situation of FIG. 4 to that of FIGS. 2 and 3 we note that if the other base station belonged to the same CDMA-based cellular radio system as the serving base station 201, the mobile station would not see the transmissions therefrom as neighboring channel interference but as (nearly) orthogonal cochannel interference. Simultaneously the known functions relating to intercell handovers would be preparing a cell change as an alternative to asking more and more downlink power from the serving base station 201. The overlapping area may cover a considerable portion of each cell, so usually maximal transmission power due to increasing distance attenuation is not even reached before a cell change becomes topical. Now we may formulate a first criterion which the mobile station may use to trigger the employment of slotted mode and measurements on neighboring frequencies.

Criterion 1: The serving base station seems to be not responding to power control commands asking for more downlink power, and preparations for an intercell handover are not in progress.

The invention allows for several practical implementations of the first criterion. Typically they are based on measuring the signal to interference ratio (or some other quantity that is directly related to downlink transmission power) in the mobile station over a period during which the mobile station transmits a number of power control commands asking for more downlink power. Said number should not be as small as one, because it is possible that a randomly occurrung transmission error causes the base station not to receive a certain power control command. On the other hand if said number is very large, a delay is introduced before the mobile station reacts by triggering the slotted mode and measurements on neighboring frequencies. A suitable number may be found through experimentation and/or simulation. If the measurement does not show an improvement that would reflect the base station having raised the downlink power level, the first criterion is met.

Basically it is possible to imagine a situation that would be a kind of mirror image to that of FIG. 4 in the uplink/downlink sense: the effect of the interfering transmitter would be felt in the uplink connection instead of downlink. The situation might be caused e.g. by some moving transmitter passing very close to the serving base station. The invention allows also for an embodiment where the base station repeatedly asks the mobile station to increase the uplink transmission power, and because the mobile station has already reached the maximal allowed uplink power level it interpretes the commands as an indication of neighboring channel interference and triggers the employment of slotted mode and measurements on neighboring frequencies. This way we may formulate Criterion 1 (mirrored): The serving base station repeatedly asks for more uplink power, although the mobile station already uses the maximal allowed uplink power, and preparations for an interell handover are not in progress.

Reaching the maximal uplink power is even more simple to detect in the mobile station than the fulfilment of the basic criterion 1 since the mobile station is always aware of both the currently used uplink transmission power and the currently valid upper limiting value of the transmission power it can use.

In order to devise some further criteria we discuss briefly some known concepts of spread spectrum reception. The initial receiving band of a spread spectrum receiver is relatively wide, because the signal to be received has been spread in the transmitting device according to a certain spreading code. The power received on the initial receiving band is the sum of the actual signal to be received and all other radio transmissions that occur at least partly on the same frequency band. Thermal noise that occurs naturally in the propagation environment of the radio frequency power counts as an additional source of power entering the receiver. Everything else than the power associated with the actual signal to be received qualifies as wideband noise to the receiver.

The receiver comprises a despreading unit the operation of which is based on a despreading code that is synchronized to the spreading code in the transmitting device. The output of the despreading unit is a narrowband signal that represents signal power collected from different parts of the power received on the wide initial receiving band. A major part of the narrowband signal should be related to the actual signal to be received, because all controlled spread spectrum transmissions on the same frequency band should be (nearly) orthogonal to the actual signal to be received and consequently blocked by the despreading unit. However, the orthogonality of the spreading codes is not perfect and there are some uncontrolled non-orthogonal transmissions like leakage power from nearby transmitters nominally operating on a neighboring frequency band. Additionally the thermal noise that entered the receiver is not orthogonal at all and the receiver generates even a thermal noise component of its own. The output of the despreading unit is therefore the sum of the actual signal to be received, something known as narrowband interference, and both external and internal thermal noise.

The spread spectrum receiver is able to either measure or estimate most of the above-mentioned power components. The total wideband power received within a relevant bandwidth is measurable and known as the RSSI or the Received Signal Strength Indicator. The amount of internal thermal noise is characteristic to the receiver architecture; it may be determined by testing and programmed to the receiver's memory as a system constant. The receiver is able to determine both the total narrowband power at the output of the despreading unit and the part of it that is related to the actual signal to be received, so both narrowband and wideband interference are at least approximately obtainable through subtraction.

In the situations illustrated in FIGS. 2 and 3 a majority of the wideband interference seen by each of the mobile stations 202, 203 and 302 comes from the other simultaneous downlink spread spectrum transmissions belonging to the same CDMA cellular radio system. The power of such wideband interference in the downlink is a decreasing function of the distance between the base station(s) and the mobile station. However, in the situation of FIG. 4 the mobile station 402 may experience a significant wideband interference component the source of which is the transmission of the other base station 401 on a neighboring frequency. The leakage of the neighboring frequency transmissions onto the relevant frequency band is a consequence of two factors: firstly, the wide frequency bands may even be partially overlapping, and secondly, the band pass filters at the transmitter of the other base station are not ideal but allow some power to go through even outside the nominal borders of the allocated frequency band.

Now we may formulate a second criterion which the mobile station may use to trigger the employment of slotted mode and measurements on neighboring frequencies.

Criterion 2: The level of wideband interference appears to be higher than it should be, taken the distance between the mobile station and the serving base station.

The invention allows again for several different implementations in the mobile station for an algorithm that determines, whether or not the level of wideband interference is higher than it should be. For example the mobile station may perform pathloss measurements, known as such, in order to approximately determine the distance between it and the serving base station, and compare the calculated level of wideband interference with a look-up table that associates typical pathloss measurements with corresponding "usual" wideband interference levels. The serving base stations may also announce the value of total transmitting power which they are emitting on a certain frequency band, so that the mobile station may reduce that value by the calculated path loss and check, whether the result is equal to the locally calculated wideband interference level. An excessively high locally calculated wideband interference level indicates that criterion 2 is fulfilled.

It is also possible for the mobile station to estimate, what is the amount of non-orthogonal narrowband interference coming from transmissions on neighboring channels. Towards this end the mobile station may first use the above-presented path loss principle to estimate the co-channel non-orthogonal interference, i.e. the power component in the output of the despreading unit that is associated with other simultaneous spread spectrum transmissions from "own" base stations. By subtracting from the total output power of the despreading unit the actual signal power, the estimated co-channel non-orthogonal interference and the internal and external thermal noise components the mobile station finds the non-orthogonal narrowband neighboring channel interference. It is the decisive factor of the next criterion:

Criterion 3a: The non-orthogonal narrowband neighboring channel interference obtained from measurements on own channel is high.

The threshold value for a "high" level of non-orthogonal narrowband neighboring channel interference is most advantageosly determined as a relative value, i.e. as a certain fraction of the current narrowband actual signal power. The most appropriate value of that fraction is found by experimenting and/or simulating.

The non-orthogonal narrowband neighboring channel interference does not need to be explicitly calculated. The mobile station may monitor the total level of narrowband interference and compare it against an estimate of what the co-channel non-orthogonal interference should be, taken the current path loss value. Therefore we may determine.

Criterion 3b: The total non-orthogonal narrowband interference is remarkably higher than an estimated co-channel non-orthogonal interference.

It is advantageous to set a threshold value at least by which the total narrowband interference must be higher than the estimate before the mobile station interpretes criterion 3b as fulfilled. This is a consequence of the fact that the estimate of the co-channel non-orthogonal interference is not an exact value.

Figure 6:
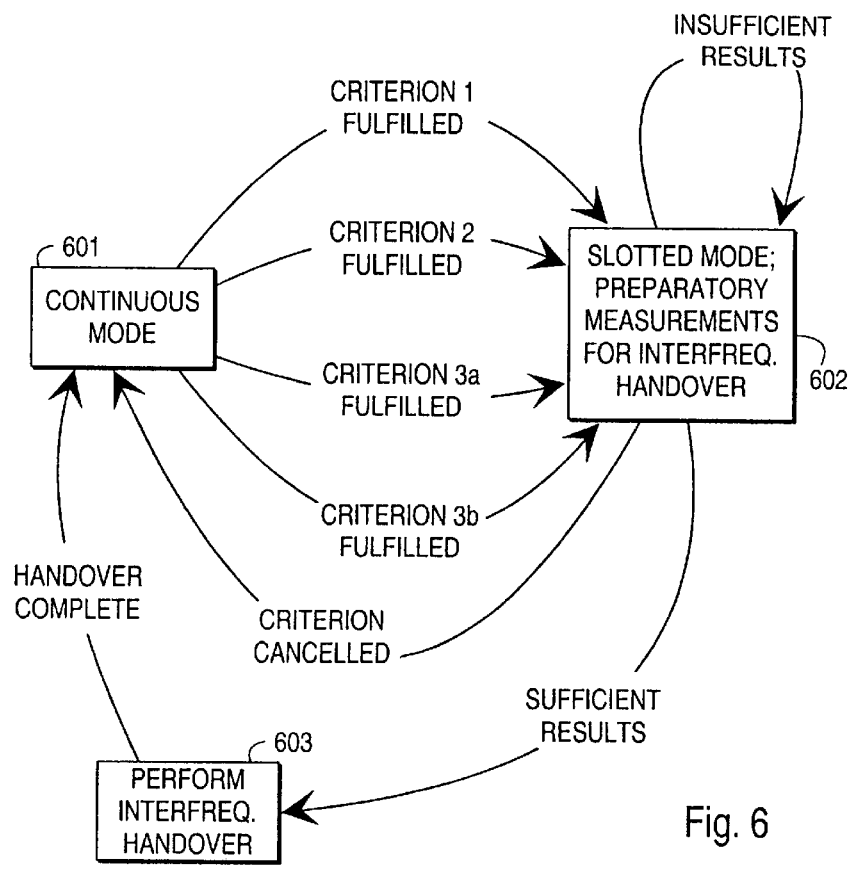
FIG. 6 is a state diagram illustrating an embodiment of the invention.

FIG. 6 illustrates an embodiment of a method according to the invention in the form of state diagram. A mobile station has three operational states of which state 601 corresponds to normal communication in continuous mode, state 602 corresponds to the employment of slotted mode and preparatory measurements for interfrequency handover, and state 603 corresponds to actually performing an interfrequency handover. A number of possible transitions between states are shown. One principle of the method illustrated in FIG. 6 is the sufficiency of any of the above-mentioned criteria alone, meaning that a transition from state 601 to state 602 occurs if any of the criteria is fulfilled. Basically the mobile station remains in state 602 as long as the measurements made during the slotted mode have not yet given enough results for performing an optimal interfrequency handover. After all required measurements have been made, the mobile station goes into state 603, which means that it performs the interfrequency handover. Thereafter it returns to the initial continuous mode state 601. It is also possible that the reason that caused the transition from state 601 to state 602 suddenly disappears before the measurements in state 602 have been completed. In such a case the mobile station returns to the continuous mode state 601 without performing any handovers.

Figure 7:
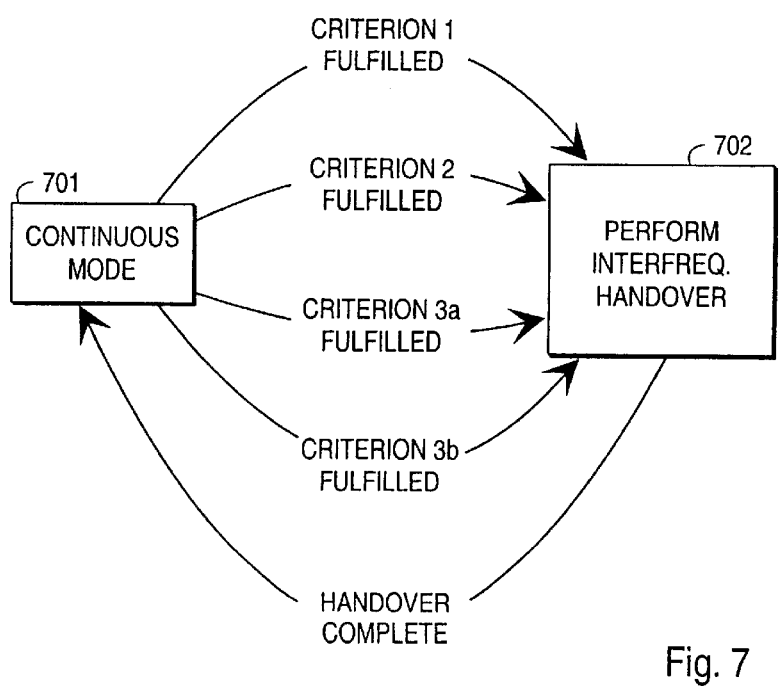
FIG. 7 is a state diagram illustrating another embodiment of the invention.

In several cases it is possible that the mobile station has already previously acquired all information it needs for a successful interfrequency handover. FIG. 7 illustrates an embodiment of the method according to the invention which is simpler than that of FIG. 6 in the sense that the fulfilment of any of the above-mentioned criteria during continuous mode immediately triggers an interfrequency handover in state 702 without the need for making any measurements therebetween. After a successful handover the mobile station returns to the continuous mode state 701.

The invention is also applicable to making decisions about which slotted mode sequence should be used. In many CDMA-based cellular radio systems the specifications define a number of different slotted mode sequences that differ from each other by the transmission duty cycle, i.e. by the ratio between active transmission time during a nominal frame period and the total length of the nominal frame period. It is easily understood that the less time there is available for active transmitting (the lower the duty cycle), the higher is the required transmission power and the worse is the interference caused to other simultaneous radio connections. On the other hand a low duty cycle leaves more time free for measurements, so the mobile station may collect more quickly the information it needs for a succesful interfrequency handover.

Figure 8:
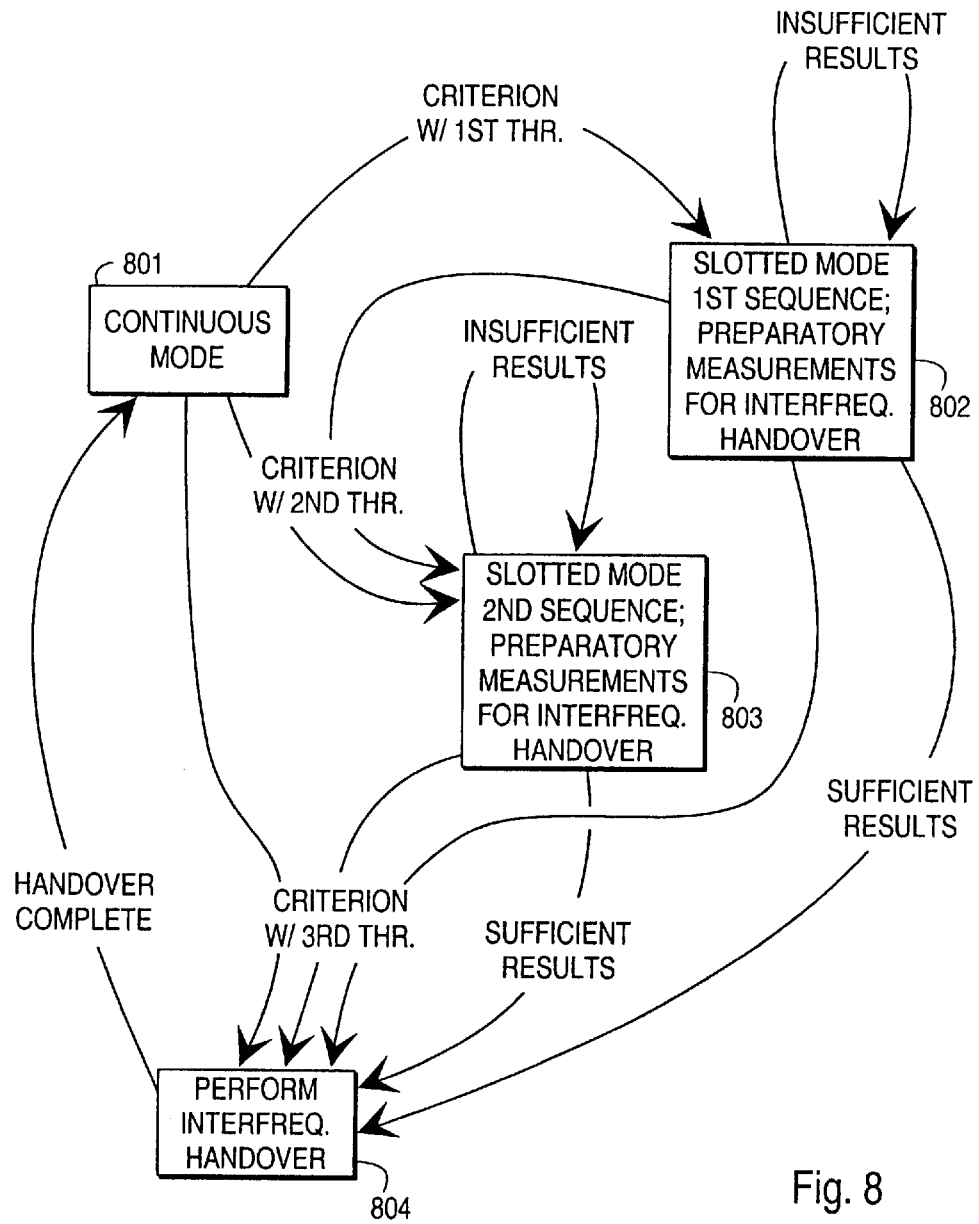
FIG. 8 is a state diagram illustrating another embodiment of the invention and FIG. 9 illustrates a mobile station according to an embodiment of the invention.

FIG. 8 illustrates an embodiment of a method according to the invention where two exemplary slotted mode sequences have been determined. State 801 represents normal operation in continuous mode, state 802 corresponds to slotted mode with a first sequence having a relatively high duty cycle, state 803 corresponds to slotted mode with a second sequence having a relatively low duty cycle and state 804 corresponds to making an immediate interfrequency handover. For each criterion there have been define three thresholds that represent different grades of severity. A criterion fulfilled up to a first threshold means that interfrequency handover may become topical but is not immediately required. A criterion fulfilled up to a second threshold means that interfrequency handover is required but there is still time to perform some measurements in order to get enough measurement information from other frequencies. A criterion fulfilled up to a third threshold means that interfrequency handover is immediately required on the basis of whatever information is available because communication on the current frequency has become impossible.

If any of the above-mentioned criteria is fulfilled up to the first threshold while the mobile station is in state 801, a transition to state 802 occurs. If the situation with the criteria does not change, a transition therefrom to state 804 follows after enough measurement information from other frequencies has been collected. However, if any of the above-mentioned criteria is fulfilled up to the second threshold while the mobile station is either in state 801 or in state 802, a transition to state 803 occurs. Again if the situation with the criteria does not change, a transition therefrom to state 804 follows after enough measurement information from other frequencies has been collected. It may happen that at least one of the above-mentioned criteria is fulfilled up to the third threshold while the mobile station is in one of the states 801, 802 or 803, causing an immediate transition to state 804. After completion of the handover the mobile station returns to state 801. Reverse transitions between states may follow in a way obvious as such on the basis of the description above if the criterion the fulfilment of which caused the latest state transition is not valid any more. In order to maintain graphical clarity such reverse transitions are not shown in FIG. 8.

Figure 9:
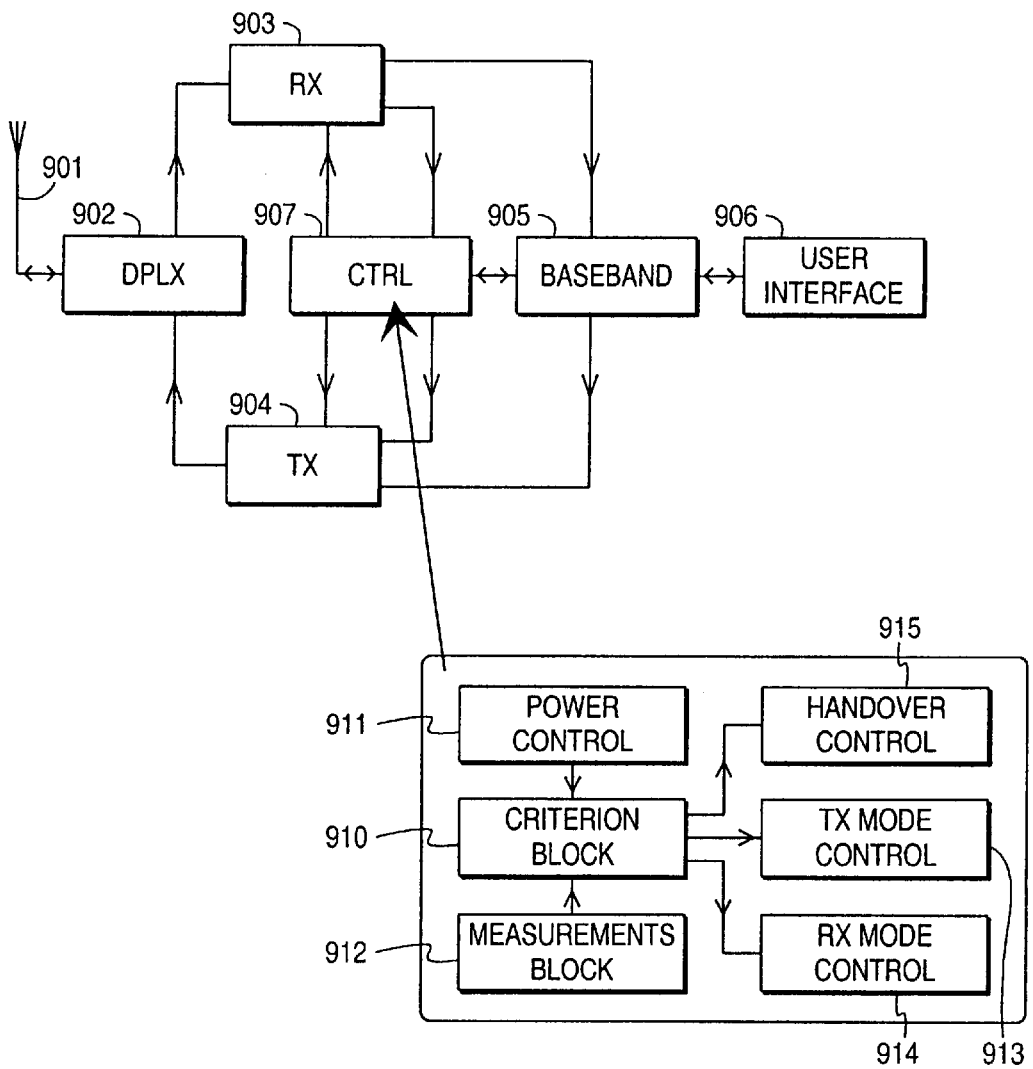

FIG. 9 illustrates schematically a mobile station according to an embodiment of the invention. An antenna 901 is coupled through a duplexing block 902 to a receiver block 903 and a transmitter block 904. The sink of payload data from the receiver block 903 and the source of payload data to the transmitter block 904 is a baseband block 905 which in turn is coupled to a user interface block 906 for communicating with a human or electronic user. A control block 907 receives control information from the receiver block 903 and transmits control information through the transmitter block 904. Additionally the control block 907 controls the operation of the blocks 903, 904 and 905.

The control block comprises, among others, a criterion block 910 which is arranged to store the implementations of the criteria used for triggering slotted mode and measurements. The criterion block 910 receives input information e.g. from a power control block 911 and a measurements block 912 of which the latter also performs the calculations needed for estimating those signal and interference quantities which are not directly obtainable from measurements. The criterion block 910 gives in turn controlling information to blocks 913 and 914 which control the transmit and receive modes respectively, as well as to block 915 which implements the actual interfrequency handover when necessary.

The exemplary embodiments of the invention which were described above should not be construed as limiting the scope of application of the appended claims.

What is claimed is:

1. A method for performing a transition from a continuous communication mode into a combined slotted communication mode and measurement mode in a mobile station of a cellular radio system, comprising the steps of:

providing a set of certain criteria to be observed during the continuous communication mode;

wherein the step of providing a set of criteria comprises the substep of providing a criterion which is fulfilled if a base station of the cellular radio system seems to be not responding to power control commands asking for more downlink power while preparations for an intercell handover are not in progress;

observing, whether at least one of said criteria is fulfilled during the continuous communication mode; and as a response to the fulfilment of at least one of said criteria is fulfilled during the continuous communication mode, changing the operation of the mobile station into the combined slotted communication mode and measurement mode.

2. A method according to claim 1, wherein the step of observing, whether at least one of said criteria is fulfilled during the continuous communication mode, comprises the substep of observing, whether cr not a serving base station is responding to a number of successive power control commands asking for more downlink power.

3. A method for performing a transition from a continuous communication mode into a combined slotted communication mode and measurement mode in a mobile station of a cellular radio system, comprising the steps of:

providing a set of certain criteria to be observed during the continuous communication mode;

wherein the step of providing a set of criteria comprises the substep of providing a criterion which is fulfilled if a base station of the cellular radio system repeatedly asks for more uplink power, although the mobile station already uses the maximal allowed uplink power, and preparations for an intercell handover are not in progress;

observing, whether at least one of said criteria is fulfilled during the continuous communication mode; and as a response to the fulfilment of at least one of said criteria is fulfilled during the continuous communication mode, changing the operation of the mobile station into the combined slotted communication mode and measurement mode.

4. A method for performing a transition from a continuous communication mode into a combined slotted communication mode and measurement mode in a mobile station of a cellular radio system, comprising the steps of:

providing a set of certain criteria to be observed during the continuous communication mode;

wherein the step of providing a set of criteria comprises the substep of providing a criterion which is fulfilled if the level of wideband interference appears to be higher than it should be, taken the distance between the mobile station and a certain base station of the cellular radio system;

observing, whether at least one of said criteria is fulfilled during the continuous communication mode; and as a response to the fulfilment of at least one of said criteria is fulfilled during the continuous communication mode, changing the operation of the mobile station into the combined slotted communication mode and measurement mode.

5. A method according to claim 4, wherein the step of observing, whether at least one of said criteria is fulfilled during the continuous communication mode, comprises the substeps of:
   measuring the path loss on a downlink signal path from a serving base station to the mobile station
   calculating the level of received wideband interference and
   deducing, on the basis of the measured path loss and the calculated level of received wideband interference, whether or not the level of wideband interference is higher than a certain threshold.

6. A method for performing a transition from a continuous communication mode into a combined slotted communication mode and measurement mode in a mobile station of a cellular radio system, comprising the steps of:
   providing a set of certain criteria to be observed during the continuous communication mode;
   wherein the step of providing a set of criteria comprises the substep of providing a criterion which is fulfilled if the non-orthogonal narrowband neighboring channel interference obtained from measurements on own channel is higher than a certain threshold, and the step of observing, whether at least one of said criteria is fulfilled during the continuous communication mode, comprises the substep of measuring neighboring channel interference on the channel on which communication takes place between a base station of the cellular radio system and the mobile station during the continuous communication mode;
   observing, whether at least one of said criteria is fulfilled during the continuous communication mode; and
   as a response to the fulfilment of at least one of said criteria is fulfilled during the continuous communication mode, changing the operation of the mobile station into the combined slotted communication mode and measurement mode.

7. A method for performing a transition from a continuous communication mode into a combined slotted communication mode and measurement mode in a mobile station of a cellular radio system, comprising the steps of:
   providing a set of certain criteria to be observed during the continuous communication mode;
   wherein the step of providing a set of criteria comprises the substep of providing a criterion which is fulfilled if the total non-orthogonal narrowband interference is remarkably higher than an estimated co-channel non-orthogonal interference, and the step of observing, whether at least one of said criteria is fulfilled during the continuous communication mode, comprises the substep of measuring neighboring channel interference;
   observing, whether at least one of said criteria is fulfilled during the continuous communication mode; and
   as a response to the fulfilment of at least one of said criteria is fulfilled during the continuous communication mode, changing the operation of the mobile station into the combined slotted communication mode and measurement mode.

8. A method for performing a transition from a continuous communication mode into a combined slotted communication mode and measurement mode in a mobile station of a cellular radio system, comprising the steps of:
   providing a set of certain criteria to be observed during the continuous communication mode;
   observing, whether at least one of said criteria is fulfilled during the continuous communication mode;
   as a response to the fulfilment of at least one of said criteria is fulfilled during the continuous communication mode, changing the operation of the mobile station into the combined slotted communication mode and measurement mode;
   wherein:
      the step of providing a set of criteria comprises the substep of providing at least a lower threshold level and a higher threshold level for fulfilling at least one of said criteria;
      the step of observing, whether at least one of said criteria is fulfilled during the continuous communication mode, comprises the substep of observing, whether that criteria for which at least a lower threshold level and a higher threshold level have been provided is fulfilled up to said lower threshold level or said higher threshold level during the continuous communication mode; and
      the step of changing the operation of the mobile station into the combined slotted communication mode and measurement mode comprises the substep of selecting a slot pattern to be used during the combined slotted communication mode and measurement mode according to the threshold level which the criteria was fulfilled up to.

9. An arrangement for changing the operation of a mobile terminal of a cellular radio system from a continuous communication mode into a combined slotted communication mode and measurement mode, comprising:
   means for storing a set of criteria that define certain relations between the used transmission power and observed interference during the continuous communication mode including at least a lower threshold level and a higher threshold level for fulfilling at least one of said criteria;
   means for observing, whether at least one of said criteria is fulfilled if a base station of the cellular radio system seems not to be responding to power control commands asking for more downlink power while preparations for an intercell handover are not in progress during the continuous communication mode including means for observing whether that criteria for which at least a lower threshold level and a higher threshold level have been provided is fulfilled up to said lower threshold level or said higher threshold level during the continuous communication mode; and
   means for reacting to an eventual fulfilment of at least one of said criteria during the continuous communication mode by changing the operation of the mobile station into the combined slotted communication mode and measurement mode including means for selecting a slot pattern to be used during the combined slotted communication mode and measurement mode according to the threshold level which the criteria was fulfilled up to.

10. An arrangement for changing the operation of a mobile terminal of a cellular radio system from a continuous communication mode into a combined slotted communication mode and measurement mode, comprising:
   means for storing a set of criteria that define certain relations between the used transmission power and observed interference during the continuous communication mode;
   means for observing, whether at least one of said criteria is fulfilled if a base station of the cellular radio system repeatedly asks for more uplink power, although the mobile station already uses the maximal allowed uplink power, and preparations for an intercell handover are not in progress, during the continuous communication mode;

means for reacting to an eventual fulfilment of at least one of said criteria during the continuous communication mode by changing the operation of the mobile station into the combined slotted communication mode and measurement mode.

11. An arrangement for changing the operation of a mobile terminal of a cellular radio system from a continuous communication mode into a combined slotted communication mode and measurement mode, comprising:

means for storing a set of criteria that define certain relations between the used transmission power and observed interference during the continuous communication mode;

means for observing, whether at least one of said criteria is fulfilled if the level of wideband interference appears to be higher than it should be, taken the distance between the mobile station and a certain base station of the cellular radio system, during the continuous communication mode;

means for reacting to an eventual fulfilment of at least one of said criteria during the continuous communication mode by changing the operation of the mobile station into the combined slotted communication mode and measurement mode.

12. An arrangement for changing the operation of a mobile terminal of a cellular radio system from a continuous communication mode into a combined slotted communication mode and measurement mode, comprising:

means for storing a set of criteria that define certain relations between the used transmission power and observed interference during the continuous communication mode;

means for observing, whether at least one of said criteria is fulfilled if the non-orthogonal narrowband neighboring channel interference obtained from measurements on own channel is higher than a certain threshold, and the step of observing, whether at least one of said criteria is fulfilled during the continuous communication mode, comprises the substep of measuring neighboring channel interference on the channel on which communication takes place between a base station of the cellular radio system and the mobile station during the continuous communication mode, during the continuous communication mode;

means for reacting to an eventual fulfilment of at least one of said criteria during the continuous communication mode by changing the operation of the mobile station into the combined slotted communication mode and measurement mode.

13. An arrangement for changing the operation of a mobile terminal of a cellular radio system from a continuous communication mode into a combined slotted communication mode and measurement mode, comprising:

means for storing a set of criteria that define certain relations between the used transmission power and observed interference during the continuous communication mode;

means for observing, whether at least one of said criteria is fulfilled if the total non-orthogonal narrowband interference is remarkably higher than an estimated co-channel non-orthogonal interference, and the step of observing, whether at least one of said criteria is fulfilled during the continuous communication mode, comprises the substep of measuring neighboring channel interference, during the continuous communication mode;

means for reacting to an eventual fulfilment of at least one of said criteria during the continuous communication mode by changing the operation of the mobile station into the combined slotted communication mode and measurement mode.

14. An arrangement for changing the operation of a mobile terminal of a cellular radio system from a continuous communication mode into a combined slotted communication mode and measurement mode, comprising:

means for storing a set of criteria that define certain relations between the used transmission power and observed interference during the continuous communication mode including at least a lower threshold level and a higher threshold level for fulfilling at least one of said criteria;

means for observing, whether at least one of said criteria is fulfilled during the continuous communication mode, including means for observing whether that criteria for which at least a lower threshold level and a higher threshold level have been provided is fulfilled up to said lower threshold level or said higher threshold level during the continuous communication mode; and means for reacting to an eventual fulfilment of at least one of said criteria during the continuous communication mode by changing the operation of the mobile station into the combined slotted communication mode and measurement mode including means for selecting a slot pattern to be used during the combined slotted communication mode and measurement mode according to the threshold level which the criteria was fulfilled up to.

* * * * *